Sept. 28, 1965     B. ECK ETAL     3,208,665
FLUID FLOW MACHINE HAVING INTERIOR GUIDE BODIES
Filed Sept. 5, 1962     5 Sheets-Sheet 1

INVENTORS
BRUNO ECK
NIKOLAUS LAING
BY
ATTORNEYS

INVENTORS
Bruno Eck
Nikolaus Laing
BY
ATTORNEYS

INVENTORS
BRUNO ECK
NIKOLAUS LAING
BY
ATTORNEYS

Sept. 28, 1965   B. ECK ETAL   3,208,665
FLUID FLOW MACHINE HAVING INTERIOR GUIDE BODIES
Filed Sept. 5, 1962   5 Sheets-Sheet 4
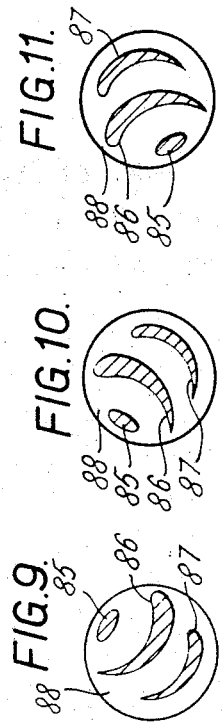
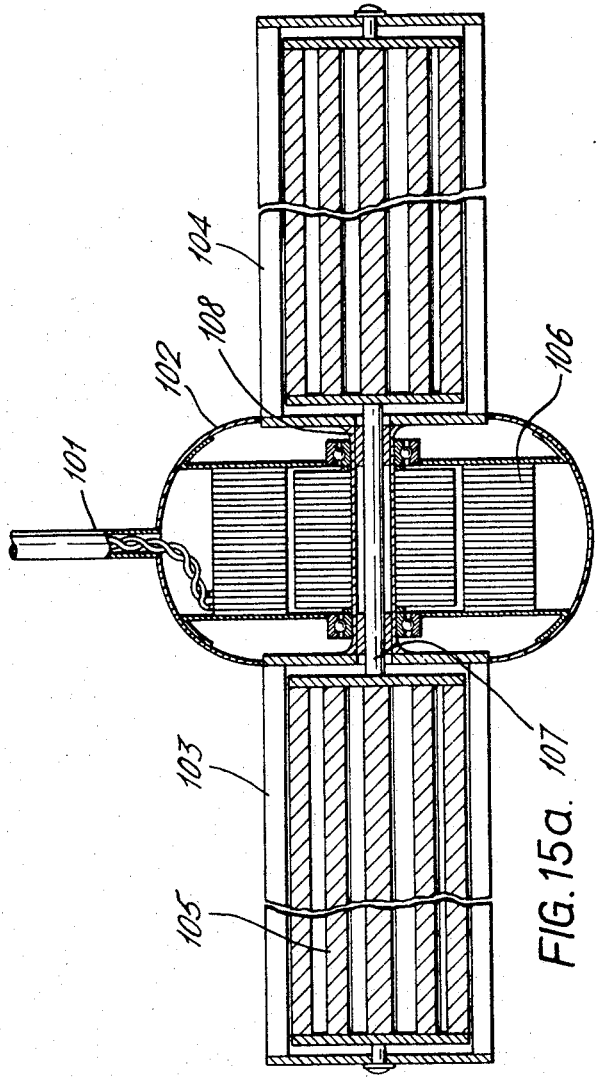
INVENTORS
BRUNO ECK
NIKOLAUS LAING
BY
ATTORNEYS

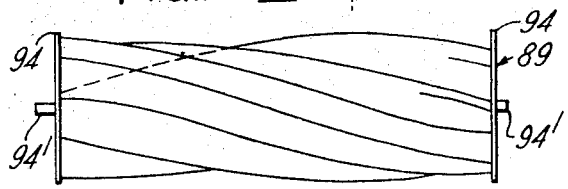
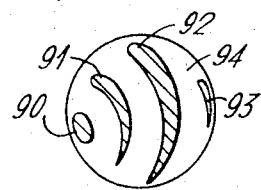
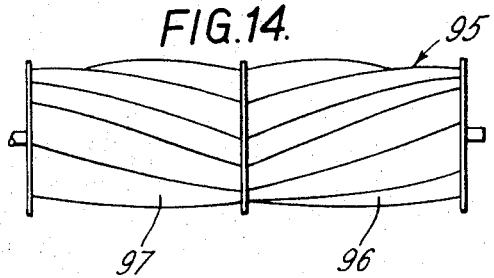
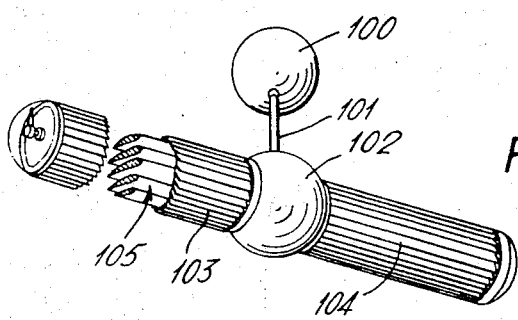
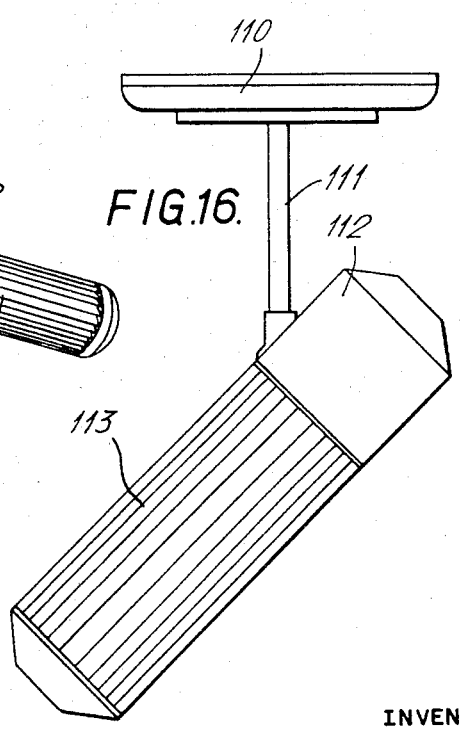

United States Patent Office 3,208,665
Patented Sept. 28, 1965

3,208,665
FLUID FLOW MACHINE HAVING INTERIOR GUIDE BODIES
Bruno Eck, Cologne-Klettenberg, and Nikolaus Laing, Stuttgart, Germany, assignors, by mesne assignments, to Laing Vortex, Inc., New York, N.Y.
Filed Sept. 5, 1962, Ser. No. 221,622
Claims priority, application Germany, July 7, 1956, L 25,261; Dec. 7, 1956, E 13,333, E 13,335; Dec. 20, 1956, L 26,468, L 26,469; Dec. 24, 1956, L 26,504
12 Claims. (Cl. 230—125)

This application is a continuation-in-part of application Serial No. 671,114, filed July 5, 1957, now abandoned.

This invention relates to a fluid flow machine having interior guide bodies and more particularly to a fluid flow machine having a cylindrically bladed rotor through which fluid passes in a plane perpendicular to the rotor axis wherein the guide bodies within the rotor guide the flow of fluid within the rotor.

A fluid machine of the general type described is disclosed in United States Patent No. 2,942,773, now Re. 25,365, wherein guide bodies are located within the rotor to guide fluid therethrough between its first and second transversals of the rotating blades as it passes through the rotor. These guide bodies extend with uniform cross-section over the length of the rotor and present guide walls which in cross section appear as curves with an inflection such that the fluid flow within the rotor follows a curve with an inflection in all of the fluid channels defined by the guide walls.

The present invention concerns itself more particularly with flow machines which may be operated under conditions of low Reynolds numbers as compared with the flow machine disclosed in the aforementioned patent. The Reynolds number at a particular fluid flow condition is a dimensionless number representing the ratio of the product of flow velocity and a characteristic linear dimension of the part under observation to the kinematic viscosity of the fluid. For the purpose of the present application Reynolds number (Re.) will be defined as $$\text{Re.} = \frac{d \cdot c}{\lambda}$$

where $d$ is the blade depth radially of the rotor, $c$ is the peripheral speed of the rotor, and $\lambda$ is the kinematic viscosity of the fluid, the latter being equal to the quotient of the dynamic viscosity and density. A Reynolds number is considered herein to be low if, as above defined, it is less than $5 \times 10^4$.

From the definition just given, it will be understood that the invention concerns more especially flow machines which are small dimensionally, run at low peripheral speeds, or are intended for use with air or other gas having a low density or used with a fluid having a high viscosity.

It is known that in a flow machine of the above-mentioned type, an initial acceleration and a subsequent deceleration of the flow occurs in boundary layers on the suction side of each blade as fluid passes over the blade. The higher the viscosity of the fluid in relation to its density or in relation to the relative velocity between the blade and fluid (i.e. the lower the Reynolds number) the greater is the deceleration of the boundary layer in the deceleration zone of the blade. If the boundary layer is slowed down sufficiently, it separates from the blade and no longer follows the blade contour. The point at which separation occurs is known as the separation point. The separation point travels forward along the surface of the blade against the direction of flow in proportion to the increase in the effect of the viscosity relative to density or to the decrease in the relative velocity between the fluid and the blade.

The movement forward of the separation point along the blade because of low Reynolds number conditions produces a number of undesirable effects in the type of flow machine described. A vorticity zone in which the kinetic energy of the fluid is converted into thermal energy is produced after the separation point with the result that the efficiency of the machine drops. The degree of deflection of the fluid in passing through the rotor and through the path of the rotating blades decreases owing to the fact that the flow does not follow the full extent of the blade profile but becomes nonlaminar beginning at the separation point. This results in less pressure gain in the machine since pressure gain is determined by the extent of the deflection of the stream tubes in the blade channel. Finally, the turbulent flow in back of the separation point effectively reduces a part of the cross-section of the blade channels so that the throughput through the rotor of the machine also diminishes.

For the reasons given, it has previously been considered that the operation of flow machines under conditions of low Reynolds numbers would necessarily and inescapably involve low efficiencies in comparison with efficiencies obtainable under conditions of high Reynolds numbers. For example, although the inefficiency of the small blowers above referred to has been notorious, it has been tolerated simply because it has not hitherto been thought capable of improvement.

It has hitherto been thought that to avoid mixing losses a flow machine should always be designed to have a rectangular velocity profile at every section taken across the flow, that is, the graph of velocity of fluid flow at a given point plotted across the flow channel should rise rapidly from zero at one side of the channel to a steady value maintained over the greater part of the section and should then drop again rapidly to zero at the other side. It has also been assumed hitherto that a flow machine of the type described should always have the blades loaded approximately equally by the fluid in the circumferential zones where the fluid passes through the rotor blades. These two related conditions can normally be satisfied without much difficulty.

Following the principles hitherto generally adhered to in the art and enunciated above, one skilled in the art would normally prefer to design a cross-flow type blower, such as that shown in Patent No. 2,942,773, now Re. 25,365, so as to work under conditions of high Reynolds numbers and would design the blade angles and ducting on the basis of, and with a view to producing a rectangular velocity profile throughout the blower and an equal loading on the rotor blades in the circumferential zones where the fluid passes these rotor blades. On the other hand, if operation at low Reynolds numbers could not be avoided, the same design principles would normally be applied and the resulting lower efficiency regarded as inevitable.

An object of the present invention is to provide a cross-flow machine capable of operating under conditions of low Reynolds numbers with better efficiency than has hitherto been regarded as acceptable.

The invention depends in part also on the appreciation that the above-mentioned velocity profile with a pronounced maximum can be obtained by setting up in the machine a cylindrical vortex including a field region with a velocity profile approximately that of a Rankine vortex and a core region eccentric to the rotor axis. A further object of the invention therefore is to provide various means for forming the vortex and for varying the positions of the vortex whereby the direction of flow at the outlet may be varied and whereby a single rotor may deliver a multiplicity of different flows in different directions.

In some applications of cross-flow fluid flow machines, it is desired that the flow of fluid delivered have an axial component of flow. It is therefore a further object of the invention to provide guide bodies that may be included within a hollow cylindrical bladed rotor to impart an axial component to flow passing from the rotor.

It is a further object of the invention to provide circulating air for structures utilizing cross-flow machines having guide bodies within the rotor to direct flow of air within the rotor. Broadly, a machine constructed according to the invention comprises a cross-flow fluid machine having a cylindrically bladed rotor, the blades of which are concave facing the direction of rotation and which have their outer edges leading their inner edges; and guide means, including at least one body member which is separate from and does not rotate with the rotor extending within the rotor along the length thereof and dividing the flow through the rotor so that a substantial part of the flow takes place on each side of the body member. The body member has a cross-section, the median line of which is generally a smooth curve which is without an inflection and which guides the fluid flow over each side so as to curve the fluid in a path curved substantially the same as the median line of the body. The body member within the rotor may form a fluid vortex which extends the length of the rotor and which has a core interpenetrating the blades of the rotor as the rotor is rotated, which vortex helps to guide the fluid passing through the rotor so that it will pass through the path of the rotating blades into the rotor and thence out of the rotor through the path of the rotating blades.

A separate vortex forming and stabilizing means may be included exterior of the rotor to work in corporation with the interior body to help form and stabilize a fluid vortex.

In addition means may be provided for rotating the body member within the rotor in order to change the direction of flow at the exit or to make the body member in separate sections wherein each section directs a portion of the fluid passing through the rotor out of the rotor in different directions.

Various embodiments of the invention are illustrated diagrammatically in the accompanying drawings in which, FIG. 1 is a cross-sectional view of a fluid machine constructed according to the invention having interior guide body means and exterior means for forming and stabilizing a fluid vortex;

FIG. 9 is a cross-section of FIG. 8 taken along lines IX—IX;

FIG. 10 is a cross-sectional view of FIG. 8 taken along lines X—X;

FIG. 11 is a cross-sectional view of FIG. 8 taken along lines XI—XI;

FIG. 12 is a side view of a guide body assembly for use in a rotor to give an axial component of flow;

FIG. 13 is a cross-sectional view of FIG. 12 taken along lines XIII—XIII;

FIG. 14 is a side view of a guide body assembly for use in a rotor to give axially opposite components of flow;

FIG. 15 is a partial broken perspective view of a ceiling fan constructed according to the invention;

FIG. 15a is an enlarged cross-sectional view of the fan shown in FIG. 15; and

FIG. 16 is a side view of a further form of ceiling fan constructed according to the invention.

Figure 1:
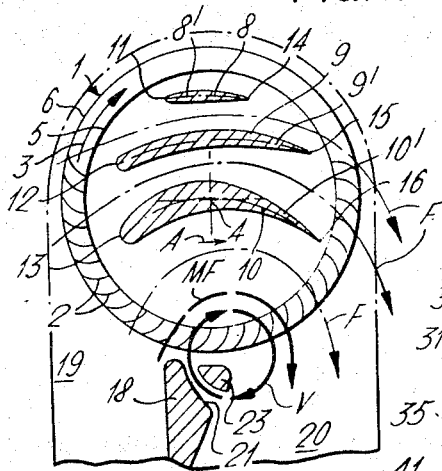

Referring to the drawings in which like parts have the same identifying numerals, the flow machine illustrated in FIG. 1 comprises a driven rotor 1 comprising a series of similar rotor blades 2 supported for rotation in the direction indicated by the arrow 3 about an axis 4, the rotor blades extending parallel to this axis and being concave facing the direction of rotation with their outer edges leading their inner edges. The inner and outer edges of the blades 2 lie on cylindrical envelopes indicated respectively at 5 and 6 while the ends of the rotor may be substantially closed by end wall means 1'.

Three guide bodies 8, 9, and 10 are mounted within the rotor 1 and are held stationary with respect to the rotor. Each body is approximately of aerofoil shape and extends with constant cross-section over the whole length of the rotor. The median line of the cross-section of each body, shown in chain dots at 8', 9' and 10', is a smooth curve which is without inflection. It will be noted that these bodies have their forward ends 11, 12 and 13 spaced further from the inner envelope 5 of the rotor blades than their rear ends 14, 15 and 16. This feature has been found to guide the fluid passing through the rotor in the proper direction when the machine is operated to minimize noise.

Outside the rotor 1 a stationary guide member 18 extends along the whole length of the rotor over a small arc thereof (about 15°). The guide member 18 has constant cross-section and extends radially from the rotor to separate an entry region 19 from an exit region 20. The member 18 presents towards the rotor 1 a wall 21 converging therewith in the direction of rotor rotation to define a wedge-shaped space within which is located an auxiliary member 23 which also extends the length of the rotor with constant cross-section.

It will be seen that a large portion of the interior of the rotor (about one third) is clear of guide bodies towards the side where the member 18 is situated. The median lines 8', 9' and 10' of the guide bodies are concave towards member 18 and progressively increase in radius going away from that member.

In operation of the flow machine a vortex forms by reason of the cooperation of the rotor blades 2 with member 18. This vortex has a core region the peripheral flow tubes of which are shown purely diagrammatically by the chain line V, the core region interpenetrating the path of rotor blades 2 and having its region of lowest static pressure extending parallel to the rotor axis. The vortex has a field region having a velocity profile approximately that of a Rankine vortex, and this profile is imposed on the throughput at the second entrance thereof to the rotor blades. The major part of the throughput is associated with the flow tubes F in the region of the maximum velocity flow tube MF and passes through the blades where they have a component of velocity in a direction opposite to the main direction of flow within the rotor indicated by the arrow A. It will be seen that in passing through the rotor the flow tube MF is turned through an angle approaching 180°.

Further information on the subject of the vortex and its preferred relation to the rotor will be found in copending application No. 671,114, now abandoned, and that application describes various ways of forming a vortex alternative to that just described. The application also explains how the vortex described results in improving efficiency of operation under conditions of low Reynolds numbers. Though the FIG. 1 flow machine is not limited to operation under low Reynolds numbers conditions, it is nevertheless extremely suitable for such operation and will act as a blower running at low peripheral rotor speeds under which conditions it combines relative silence with efficiency.

Figure 2:
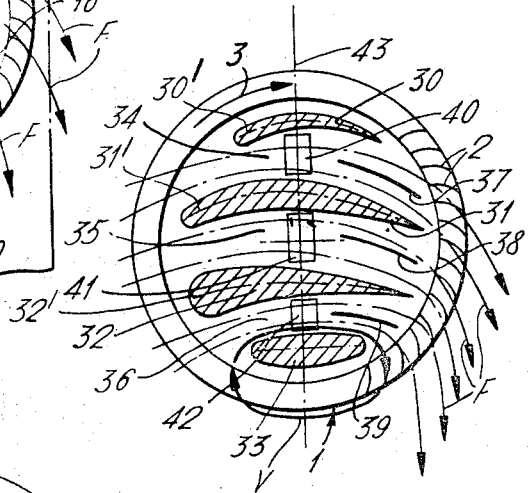
FIG. 2 is a cross-sectional view of a fluid flow machine having only interior guide bodies for forming and stabilizing a fluid vortex combined with control means for regulating the flow through the rotor.

FIG. 2 shows another flow machine having a rotor 1 similar to that of FIG. 1 and also which may be substantially closed at its ends by end wall means not shown and having guide bodies which are located stationary within the rotor and extend with constant cross-section over its whole length. These guide bodies 30–33 have the median lines 30', 31', 32' and 33' of their cross-section forming smooth curves which are without point of inflection. Supplementary guide bodies 37, 38 and 39 of thin sheet material, also extending the length of the rotor and forming in section smooth uninflected curves, are mounted at the downstream side of the flow channels between the guide bodies 30–33 such that one supplementary guide body ties in each channel. Control louvres comprising flaps are mounted within the rotor 1 with their axes lying in a common plane and intersecting the rotor axis 4. In the section illustrated, three flaps are shown at 40, 41 and 42 one for each channel 34, 35 and 36 which are rotatable in the manner of butterfly valves about a common axis 43. The louvres can be set to produce negligible obstruction to through-flow, or to prevent flow altogether, or to intermediate positions.

It will be appreciated that the guide body 33 of FIG. 2 has the same sort of flow-guiding effect on flow passing through the rotor as does the member 18 of FIG. 1, in that fluid circulates around this body through the rotor blades to form a vortex having a core V. The vortex formed has a velocity profile with the character of that of a Rankine vortex which is imposed on the fluid at its second entrance to the rotor blades.

Figure 2A:
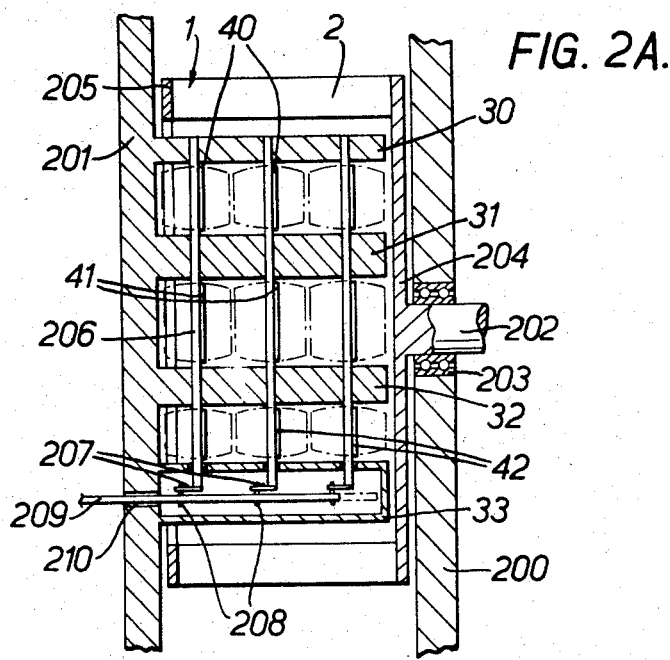
FIG. 2a is a longitudinal section of the FIG. 2 machine.

Turning now to FIG. 2a, the flow machine will be seen to comprise a pair of parallel walls 200 and 201. The rotor 1 is supported on a shaft 202 journalled in a bearing 203 in the side wall 200. The blades 2 of the rotor 1 extend between disc 204 mounted on the end of the shaft 202 close to the wall 200 and a ring 205 close to the wall 201. The guide bodies 30, 31, 32, 33 are supported on the wall 201, and extend therefrom into the interior of the rotor, terminating close to the plate 204. The flow control flaps 40 are fixed to vertical spindles 206 which extend through and are journalled in the guide bodies 30, 31, 32, 33. The guide body 33 is hollow and, within that body, the spindles 206 carry cranks 207 pin-connected at 208 to a control lever 209 extending through a slot 210 in the end wall 201. Horizontal movement of the control lever 209 pivots the spindles 206, and with them the flow control flaps 40, 41, 42 between the positions illustrated in FIGS. 2 and 2a, and the position shown chain dotted in FIG. 2a where the flaps close off the greater part of the area otherwise available for flow within the rotor, and thereby substantially prevent flow therethrough.

In the construction of FIG. 3 the rotor 1 is again similar to that of FIG. 1 and may be substantially closed at its ends by end wall means, not shown. In this embodiment only a single aerofoil guide body 45 which extends the length of the rotor and which has a uniform cross-section along its length. Once again the median line of the cross-section, 45', is a smooth curve without inflection. In operation the rotor and body 45 co-operate to form a vortex somewhat as in the previously described embodiments, the core region being indicated at V.

Figure 3:
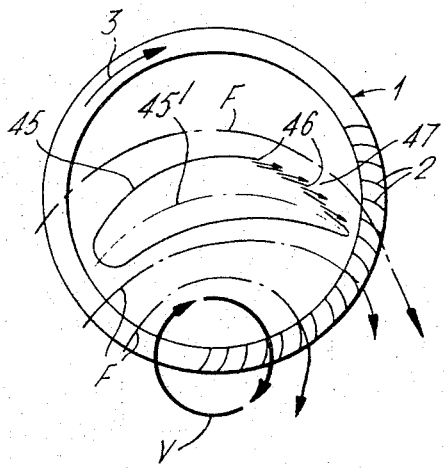
FIG. 3 is a cross-sectional view of a fluid flow machine having a single guide body within the rotor for directing flow of fluid within the rotor.

Aerofoil guide bodies as used in flow machine according to the invention can, like other aerofoil bodies, be subject to boundary layer separation at low pressure regions. FIG. 3 shows one way in which separation losses can be reduced. The body 45 is hollow and in communication with fluid at ambient pressure. The convex surface of the body on the downstream side, which is where separation would otherwise tend to occur, is formed with a multiplicity of tangentially directed apertures 46 to allow the low pressure in the region 47 to suck fluid from the hollow body 45 in a direction tangential to that surface thereof.

The direction of fluid flow through the rotor is indicated by the lines F and once more it will be seen that this flow takes place along smooth curves which are without inflection.

Figure 3A:
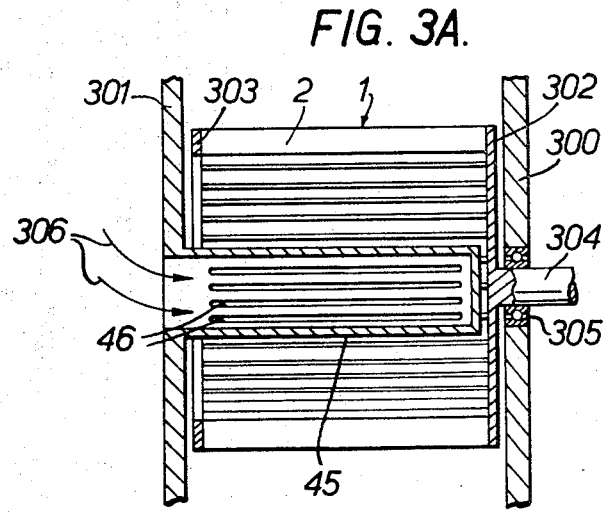
FIG. 3a is a longitudinal section of the FIG. 3 machine.

The rotor 1 of FIG. 3 rotates between side walls 300 and 301 as shown in FIG. 3a and has its blades 2 extending between a supporting end disc 302 and a ring 303. The rotor 1 is mounted upon a shaft 304 journalled in a bearing 305 in the end wall 300, the end of the shaft 304 carrying the rotor end disc 302. The body 45 is supported on the end wall 301 and projects therefrom into the interior of the rotor terminating adjacent the rotor end disc 302. Ambient air may enter the interior of the body 45 as shown by the arrows 306.

Figure 4:
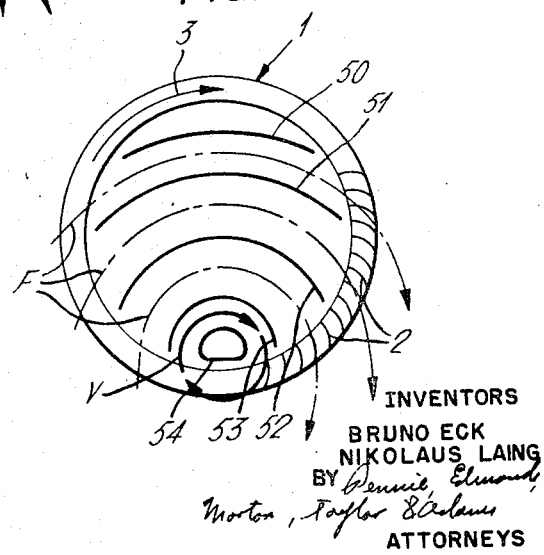
FIG. 4 is a cross-sectional view of a fluid flow machine having a plurality of thin sheet-like guide bodies for directing flow of fluid within a rotor.

FIG. 4 shows a flow machine resembling that of FIG. 2 except that instead of the aerofoil guide members 30–33 thereof, guide member 50, 51, 52, 53 and 54 of sheet material are provided each extending the length of the rotor 1. Members 50, 51, 52 and 53 appear in transverse section as arcs of circles while member 54 is a closed body presenting an arcuate surface to the interior of the rotor. All the arcs are concave toward the rotor blades adjacent body 54 and decrease in radius towards that body. The bodies 50–54 are curved to correspond to flow tubes in a vortex of the character of a Rankine vortex. Such a vortex is set up in operation of the machine with the same sort of result as previously indicated. Again flow through the rotor is indicated—entirely diagrammatically—by the flow lines F.

Figure 5:
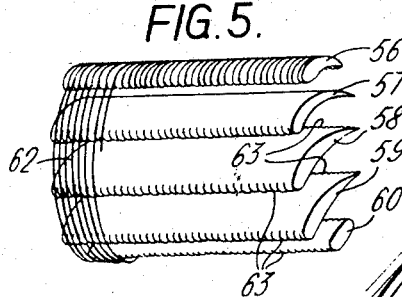
FIG. 5 is a perspective view of a plurality of guide bodies adapted to be fitted into a rotor combined with a heating coil.

The guide bodies 56, 57, 58, 59 and 60 of the assembly of FIG. 5 are of aerofoil shape and, except for their numbers, are similar to the guide bodies 30–33 of FIG. 2. Flow takes place as shown in FIG. 2. The guide bodies 56–61 of FIG. 5, which are made of refractory material, are secured together by means not shown and support a heating coil indicated at 62, only part of which is shown. The front and rear edges of the guide bodies 56–60 are serrated as shown at 63 so that the coil can be formed by a single wire wound about the bodies and received in the notches, the notches holding the turns of the coil in proper spaced relationship.

The coil 62 fulfills another function besides heating, as its provides a turbulence grid. The interval between the wires $d$ can be made of the same order of magnitude as the diameter of the wire and the flow machine can be operated under conditions of very low Reynolds numbers with hot gases such that the expression $$Re. = \frac{d.v}{V} = 10^2$$

where $v$ is the throughput velocity and $V$ the kinematic viscosity. If the heating is switched off, thus effectively varying the kinematic viscosity, flow takes place under turbulent conditions and the throughput immediately rises. Conversely if the machine is operated at conditions of very low Reynolds numbers with cold liquids, the effect of passing a suitable current in the coil 62 will be to cause the flow to take place under turbulent conditions with a marked increase of throughput. It will be understood that the effect of the coil is to cause "micro-turbulence" and that this tends to diminish the separation that would otherwise occur on the low-pressure side of each rotor blade upon the second transversal of the flow over the blades as the fluid leaves the rotor. Turbulence grids can sometimes be used to advantage with other embodiments of the invention.

Figure 6:
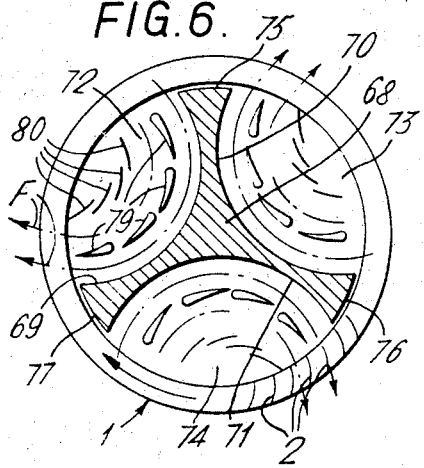
FIG. 6 is a cross-sectional view of a multi-flow fluid flow machine having a single rotor.
Figure 8:
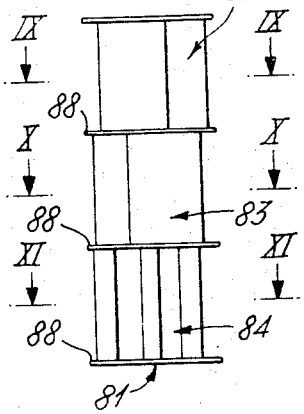
FIG. 8 is a side elevation of a guide body assembly for use in a rotor having multiple outlets and inlets.

FIG. 6 shows a construction where a single rotor can be made to produce three independent outputs by means of one or more guide bodies located within it, and defining independent flow chambers. The rotor 1 as in FIG. 1 is closed off by end wall means not shown and has located approximately symmetrically with it, and extending over its whole length, a guide 68 having uniform cross-section along its length and presenting part-cylindrical concave walls 69, 70 to 71 towards the inner envelope 5 of the rotor so as to define therewith three flow chambers 72, 73 and 74. The guide body 68 has three convex part-cylindrical walls 75, 76 and 77 centered on the rotor axis and extending over diagrammatically opposed arcs in close proximity to the inner envelope 5 of the rotor. Thus apart from plugs of fluid brought round by the rotor between adjacent blades, which form a negligible quantity, the chambers 72, 73 and 74 are independent of one another.

Flow is guided through each of the chambers 72, 73 and 74 by means of two sets of guide bodies 79 and 80, only those in chamber 72 being shown. Each guide body of each set has the median line of its cross-section extending in a smooth curve without inflection, and as a result, flow is guided through the chamber as generally indicated by the chain lines F. Guide bodies 79 are of aerofoil shape and guide bodies 80 are made of sheet metal.

Figure 7:
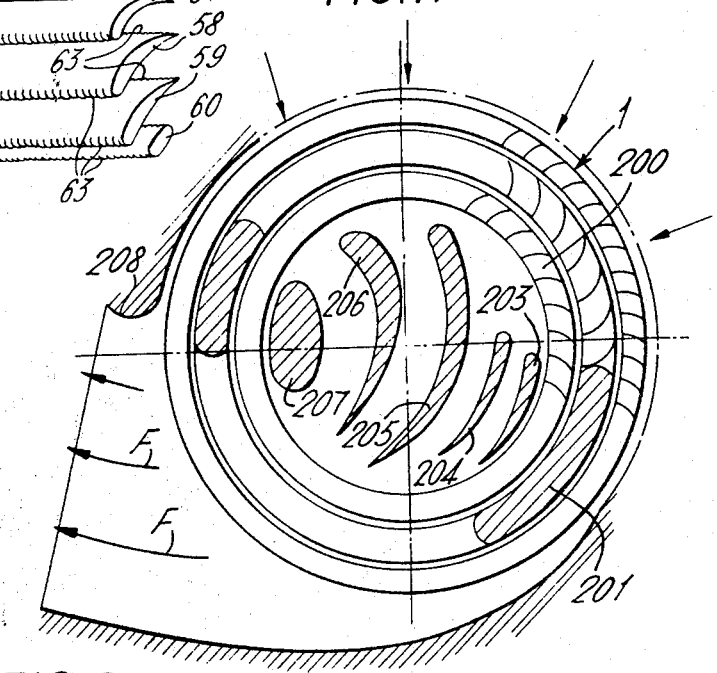
FIG. 7 is a cross-sectional view of a multi-stage fluid flow machine having interior guide bodies for directing flow through the machine.

FIG. 7 shows a flow machine according to the invention providing a four-stage momentum exchange between moving blades and fluid. In addition to a rotor 1 similar to those above described, a second similar rotor 200 is provided which is coaxially mounted with the rotor 1 but separated therefrom by a fixed blade ring 201. Guide bodies 202, 203, 204, 205, 206 and 207 generally similar to those in FIG. 2 are within the rotor 200 and exit duct means 208 are provided. In operation flow takes place much as in FIG. 2 except that there is no circulation of fluid about the body 207 and so no vortex, properly speaking, forms. However, in this embodiment no vortex is needed to guide the flow through the rotor, the guide bodies alone being sufficient.

Where the flow leaves a machine according to the invention through an outlet defined by ducting or like means extending from the rotor, the direction of this flow can be varied by moving the outlet, normally with other guide means as well. In other machines where, as in FIG. 2, the outlet depends on the orientation of the guide bodies within the rotor and no ducting is provided, the outlet direction can be altered simply by moving the guide bodies as a group about the rotor axis. Thus a ventilating fan producing a jet of air rotating like the beam of a beacon can be made by allowing the guide bodies to rotate as a group against frictional restraint under the torque produced by the reaction forces due to air flow over these bodies. If it is desired that the jet should oscillate, this can be arranged by oscillating the guide bodies about the rotor axis, e.g. by one of the devices well known for the purpose of oscillating domestic fans of the electrically-driven axial flow type.

It is possible to produce a flow in more than one direction without moving the flow bodies. FIGS. 8 to 11 show an assembly of guide bodies, designated generally 81, for use with a single rotor such as that shown in FIG. 1. The assembly 81 is made in three sections 82, 83 and 84 joined together, each section comprising three guide bodies 85, 86 and 87 of constant cross-section assembled between discs 88. Except that the bodies 85 to 87 are only three in number, they are similar to the guide bodies of FIG. 2 and function in the same manner. The sections 85, 86 and 87 are similar except that each is oriented at 120° to the next. It is seen that if the guide body 81 is used in a machine of the type described, flow in three directions is produced, the axes of the jets being angularly displaced one from the next by 120°.

The guide body 81 can have each of its sections provided with control louvres as described with reference to FIG. 2 so that the outflow in each of the three directions can be varied as desired.

The guide body assembly of FIGS. 12 and 13, which is designated generally 89, includes guide bodies 90, 91, 92 and 93 which are secured between end discs 94, having stub shafts 94' projecting axially to enable the assembly to be mounted within a rotor such as the rotor 1 of FIG. 1. At any cross-section the guide bodies 90–93 resemble the bodies 30–33 of FIG. 2 in all essentials and reference should be made to the description relating to that figure for further details of the guide bodies 90–93 which, like the bodies 30–33, have the median lines of their cross-section in the form of smooth curves without inflection and guide fluid flow through the rotor as shown by the chain-lines at F. However, unlike the guide bodies 30–33 the guide bodies 90–93 are twisted so that corresponding points of each body lie on a steep pitched helix. Thus the main direction of out-flow of a flow machine incorporating the guide body assembly 89 changes uniformly going along the axis of the machine. The outflow has also an axial component.

FIG. 14 shows a guide body assembly 95 comprising two sub-assemblies 96 and 97 each similar to the guide body assembly 89 just described and arranged to produce mirror symmetry about the transverse plane on which they are joined.

FIGS. 15 and 15a show a practical form of ceiling fan including a fixture 100 adapted to be secured to a ceiling, a support tube 101 depending vertically from the fixture, and a housing 102 mounted on the tube 101 for rotation about a vertical axis and containing an electric motor 106 driving a pair of similar rotors 103 and 104 projecting horizontally from either side of the housing. Each of the rotors is similar to the rotor 1 of FIG. 1, and each contains within it an assembly of guide bodies 105 which, except in number, resemble the guide bodies 30–33 of FIG. 2. The guide bodies 105 extend from end to end of the respective rotor with constant cross-section and may be mounted on a shaft 107 in turn mounted for free rotation within the rotor shaft 108 such that the bodies may be rotated as a group within the rotor by application of an outside force. The guide bodies within the rotor 103 are arranged to produce (as reference to FIG. 2 will show) an outflow into the paper as the fan is shown in the FIG. 15 and the guide bodies in the rotor 104 are arranged to produce an outflow out of the paper. Thus in operation of the fan, the assembly of housing 102 and rotors 103 and 104 will rotate slowly about the vertical axis in a clockwise direction due to the reactions of the two outflows. The guide bodies 105 in each rotor may be subjected to oscillations so that the jets of air produced by the rotors oscillate similarly, with a consequent increase in their effective range.

The ceiling fan of FIG. 16 is a modification of that of FIG. 15, incorporating a ceiling fixture 110, supporting tube 101 and housing 112, rotatably mounted theron, but having only one rotor 113 which is carried at an angle to the vertical. Once again, the housing 112 and rotor 113 rotate slowly about a vertical axis when the fan is in operation.

We claim:

1. A fluid flow machine of the cross flow type comprising a hollow cylindrically bladed rotor mounted for rotation about an axis wherein said blades are concave facing the direction of rotation with their outer edges leading their inner edges; and flow guide means positioned interiorly of the rotor comprising at least one guide body in the form of a cambered airfoil having smooth outer surfaces spaced from the inner periphery of said rotor blades to define flow channels on each side of said body, wherein said guide body extends the full length of the rotor wherein the median line of said guide body forms a smooth curve without inflection and is curved in the direction of rotation of the rotor, and said guide body is held against rotation with respect to said rotor whereby fluid will be caused to flow from the exterior of said rotor from a suction side through the path of the rotating blades into the rotor and be guided by the surfaces of the said guide body into the path of the rotating blades on the delivery side of the rotor and wherein fluid passing from the suction side of said rotor to the delivery side is turned in excess of 90°.

2. A fluid flow machine according to claim 1 wherein said guide body has an upstream end and a downstream end and wherein its downstream end is positioned closer to the inner periphery of the rotor blades than its upstream end.

3. A fluid flow machine according to claim 1 wherein said guide body has an airfoil shape.

4. A fluid flow machine according to claim 1 wherein said guide body has a hollow airfoil shape with a series of perforations on the trailing edge thereof; and pressure means communicating with the interior of said body whereby the interior of said body may be subjected to a higher fluid pressure than the exterior thereof in order that fluid will flow tangentially through said perforations to reduce boundary layer separation of fluid passing over the body from the inlet to the outlet of the rotor.

5. A fluid flow machine of the cross flow type comprising a hollow cylindrically bladed rotor mounted for rotation about an axis wherein said blades are concave facing the direction of rotation with their outer edges leading their inner edges; and a plurality of guide bodies in the form of cambered airfoils having smooth outer surfaces spaced internally of the rotor to define flow channels on opposite sides of each guide body wherein the guide bodies extend the full length of the rotor and wherein each has a median line forming a smooth curve without inflection and is curved in the direction of rotation of the rotor, said guide bodies forming and stabilizing when said rotor is rotated a fluid vortex extending the length of the rotor leaving a core eccentric to the rotor axis and interpenetrating the path of the rotating blades whereby fluid is induced to flow through the rotor from the suction side through the path of the rotating blades to the interior of the rotor to be guided by the surfaces of the guide bodies into the path of the rotating blades on the delivery side in a plane perpendicular to the rotor axis, and whereby a major part of the fluid throughput passes through the path of the rotating blades where they have a component of velocity in a direction opposite to the main direction of flow within the rotor.

6. A fluid flow machine according to claim 5 having movable control louvres positioned between adjacent bodies whereby in one position said louvres obstruct the flow of fluid through said rotor and in another position present minimum resistance to the flow of fluid.

7. A fluid flow machine of the type comprising a hollow cylindrically bladed rotor mounted for rotation about its axis wherein said blades are concave facing the direction of rotation with their outer edges leading their inner edges; a plurality of guide bodies located within the rotor extending the length thereof wherein each said guide body has in cross-section a median line forming a substantially smooth curve which is without inflection whereby fluid will be caused to flow into said rotor through the path of the rotating blades from a suction side and thence out of the rotor through the path of the rotating blades to the pressure side; and body rotation means whereby the guide bodies may be rotated as a group to vary the direction of fluid outlet from the machine.

8. A fluid flow machine according to claim 7 wherein said guide bodies are twisted along their lengths whereby the direction of fluid flow from the outlet varies along the length of the machine.

9. A fluid flow machine according to claim 7 wherein said guide bodies are divided into a plurality of lengths by transverse walls and wherein the guide bodies in each length are twisted with respect to adjacent guide bodies in adjacent lengths whereby the direction of fluid flow from the outlet varies along the length of the machine.

10. A fluid flow machine of the type comprising a base member; a hollow cylindrically bladed rotor mounted for rotation about a shaft journalled in said base member wherein said blades are concave facing the direction of rotation with their outer edges leading their inner edges; flow guide means spaced internally of the rotor having at least one guide body extending the length of the rotor, with the median line of each guide body in cross section forming a substantially smooth curve which is without inflection and wherein each said body is held against rotation with said rotor whereby fluid will be caused to flow from the exterior of said rotor from a suction side through the path of the rotating blades into the rotor and thence out of the rotor through the path of the rotating blades to a pressure side; and a support member journalled to said base member whereby the reaction forces set up by operation of the machine will cause said base member and attached rotor to rotate about said support member.

11. A fluid flow machine according to claim 10 having in addition a second rotor and associated guide means with the second rotor being journalled in said base member on the opposite side thereof as first-mentioned rotor and wherein the guide bodies in said second rotor are positioned 180° with respect to the guide bodies in said first-mentioned rotor whereby the reaction forces from both said rotors will tend to rotate said base member and attached rotors about said support member.

12. A ventilating fan comprising a hollow cylindrical bladed rotor mounted for rotation about its axis and having its blades concave facing in the direction of rotation; flow guide means wholly situated within the rotor and extending over its length and being spaced from the inner edges of the blades by at least one half of the blade depth, said flow guide means comprising a plurality of guide bodies each having in cross-section a median line which is a smooth curve without inflection and all said lines curving in substantially the same direction, said flow guide means defining a suction side of said rotor and a pressure side thereof, said rotor and flow guide means cooperating on rotor rotation to induce a flow of air from the suction side through the path of the rotating blades into the interior of the rotor and thence again through the path of the rotating blades to said pressure side, and said flow following paths curved in the same direction as the median lines whereby air in passing from said suction to said pressure side is turned through an angle in excess of 90°.

References Cited by the Examiner

UNITED STATES PATENTS

| | | | |
|---|---|---|---|
| 507,445 | 10/93 | Mortier | 230—125 |
| 2,658,700 | 11/53 | Howell | 230—125 |
| 2,942,773 | 6/60 | Eck | 230—125 |

KARL J. ALBRECHT, *Primary Examiner.*

JOSEPH H. BRANSON, JR., *Examiner.*